(No Model.)
R. D. MESSINGER.
BRAKE FOR HAND TRUCKS.
No. 416,846. Patented Dec. 10, 1889.
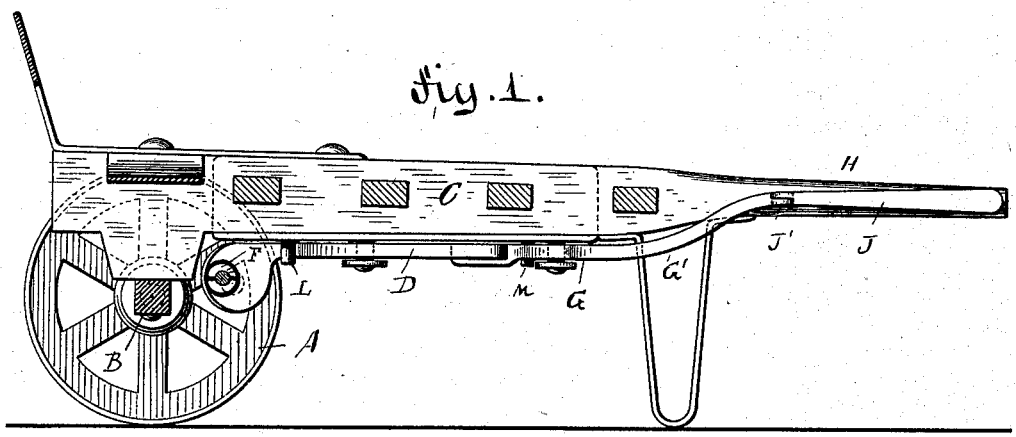
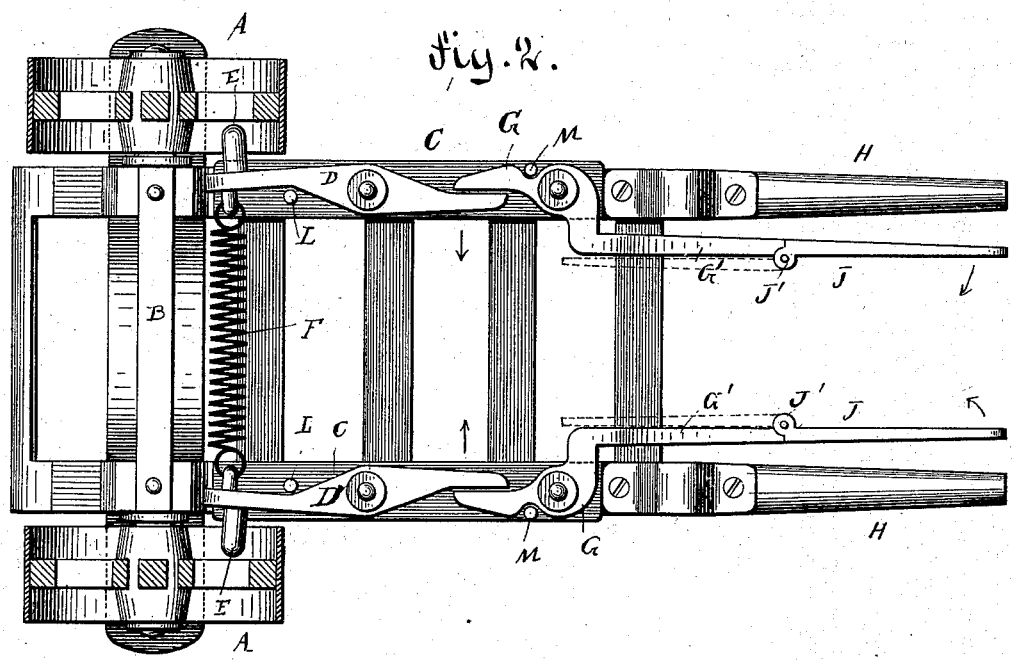
WITNESSES:
INVENTOR
Robert D. Messinger
BY
ATTORNEYS

UNITED STATES PATENT OFFICE.

ROBERT D. MESSINGER, OF NEW YORK, ASSIGNOR OF ONE-HALF TO JOHN HOLLER, OF BROOKLYN, NEW YORK.

BRAKE FOR HAND-TRUCKS.

SPECIFICATION forming part of Letters Patent No. 416,846, dated December 10, 1889.

Application filed October 24, 1889. Serial No. 327,987. (No model.)

*To all whom it may concern:*

Be it known that I, ROBERT D. MESSINGER, of the city, county, and State of New York, a citizen of the United States, have invented certain new and useful Improvements in Brakes for Hand-Trucks, of which the following is a specification.

This invention relates to a new and improved brake for hand-trucks usually used by stevedores and dockmen for transporting barrels, boxes, &c., and the object of my invention is to provide a brake for trucks of this kind which can easily be applied at any time by the person using the truck without requiring him to release the truck-handles, and the levers for operating said brake can be swung out of the way entirely when not in use.

The invention consists in a brake constructed with two levers pivoted to the under sides of the side bars and having at the front ends lateral projections that can engage the wheel-spokes, a spring for drawing the pins and the ends of the levers from which they project toward each other, elbow-levers pivoted to the under side of the truck side bars for operating the levers, having the lateral projections and handles on said elbow-levers.

The invention also consists in the construction and combination of parts and details, as will be fully described hereinafter, and finally pointed out in the claims.

In the accompanying drawings, Figure 1 is a vertical longitudinal sectional view of a truck provided with my improved brake. Fig. 2 is a plan view of the under side of the same, the wheels being shown in horizontal section.

Similar letters of reference indicate corresponding parts.

The wheels A are mounted to turn on the axle B, secured to the side or handle bars C of the truck. To the under side of each side bar C a lever D is pivoted, which is provided at the end nearest the axle with an outwardly-projecting pin E, that can engage the spokes of the wheels. The ends of the two levers D are connected to a powerful spring F. The opposite ends of said levers D rest against the inner ends of the elbow or angle levers G, pivoted at their angles to the under sides of the side bars C, and having shanks G', extending in the direction toward the ends of the handles H, which are a continuation of the side bars C. To the ends of the shanks G' the levers J are hinged by knuckle-joints J' in such a manner that they can be swung against the inner edges of the shanks G', so as to be out of the space between the handles H, as shown in dotted lines in Fig. 2.

L L and M M are stop-pins for the levers D and G, respectively.

Ordinarily the handle-levers J are a short distance from the inner sides of the handles H, so as not to interfere with grasping the said handles when it is desired to control or check the speed of the hand-truck. The handle-levers J are pressed toward the inner sides of the handles H, whereby the inner ends of the elbow-levers G are pressed toward the longitudinal central line of the truck, as indicated by the arrows in Fig. 2, and, acting on the outer ends of the levers G, press them in the same direction, whereby the opposite ends of said levers D are pressed from each other and the pins E engaged with the spokes of the wheels, thereby preventing the wheels from rotating. By forcing those ends of the levers D nearest the wheels from each other the spring F is brought in tension, and as soon as the levers J are released pulls the ends of the levers D nearest the wheels toward each other, thereby withdrawing the pins E from the wheel-spokes.

Laborers using trucks usually pull the trucks and do not push them, and their backs are turned to the front parts of the trucks, and it is thus necessary that the brake-levers that are to be used for controlling the brake on the truck should be adjacent to the handles of the truck.

Having thus described my invention, I claim as new and desire to secure by Letters Patent—

1. The combination, with a truck, of levers pivoted to the under sides of the side bars of the truck, lateral projections on the ends of said levers, which lateral projections can engage the spokes of the truck-wheels, a spring for drawing the pins and those ends of the levers to which they are attached to the wheel-spokes, levers pivoted to the under side of the side bars and resting against the outer ends of the lever having the lateral projections, and handles connected with said elbow-levers, substantially as set forth.

2. The combination, with a truck, of levers pivoted to the under sides of the side bars of the truck, lateral projections on the ends of said levers, which lateral projections can engage the spokes of the truck-wheels, a spring for drawing the pins and those ends of the levers to which they are attached from the wheel-spokes, levers pivoted to the under side of the side bars and resting against the outer ends of the levers having the lateral projections, and handle-levers connected by knuckle-joints with the outer ends of elbow-levers and adapted to be swung against the inner edges of the same, substantially as set forth.

In testimony that I claim the foregoing as my invention I have signed my name in presence of two subscribing witnesses.

ROBERT D. MESSINGER.

Witnesses:
OSCAR F. GUNZ,
JOHN A. STRALEY.